United States Patent [19]

Yamamoto et al.

[11] Patent Number: 4,485,650
[45] Date of Patent: Dec. 4, 1984

[54] METHOD OF MEASURING THE NORMALIZED MAGNITUDE OF RING OPENING IN SPIRAL PIPE

[75] Inventors: Hiroshi Yamamoto; Masaki Motomura; Keisuke Kawaguchi, all of Kitakyushu, Japan

[73] Assignee: Nippon Steel Corporation, Tokyo, Japan

[21] Appl. No.: 409,104

[22] Filed: Aug. 18, 1982

[30] Foreign Application Priority Data

Aug. 19, 1981 [JP] Japan .................................. 56-128693
Jun. 19, 1982 [JP] Japan .................................. 57-104688

[51] Int. Cl.$^3$ ...................... B21B 37/00; B21C 37/12
[52] U.S. Cl. ........................................... 72/12; 72/49
[58] Field of Search ....................... 72/49, 12, 702; 228/17.7, 102, 103, 145; 324/209; 378/59, 72

[56] References Cited

U.S. PATENT DOCUMENTS

| | | | |
|---|---|---|---|
| 3,639,760 | 2/1972 | Mizunuma | 378/72 |
| 3,792,348 | 2/1974 | Rollwitz et al. | 324/209 |
| 3,845,645 | 11/1974 | Gebauer | 72/12 |
| 3,979,231 | 9/1976 | Gondo et al. | 148/12 R |
| 4,128,762 | 12/1978 | Nagao et al. | 378/72 |
| 4,316,146 | 2/1982 | Jilken | 324/209 |
| 4,416,131 | 11/1983 | Davis | 72/49 |
| 4,436,239 | 3/1984 | Tsuyama et al. | 72/16 |

FOREIGN PATENT DOCUMENTS 2509329  9/1976  Fed. Rep. of Germany .......... 72/49

*Primary Examiner*—E. Michael Combs
*Assistant Examiner*—Charles Rosenberg
*Attorney, Agent, or Firm*—Wenderoth, Lind & Ponack

[57] ABSTRACT

First, an equation expressing the relationships among the equivalent of the subsurface residual stress at a given point of material strip before entering a spiral-pipe forming machine, the equivalent of the subsurface residual stress at the corresponding point of formed pipe, the dimensions of the material strip, the outside diameter of the pipe, and the normalized magnitude of ring opening in the pipe is established using their measured values. Then, the equivalents of the subsurface residual stresses are measured while the pipe is being manufactured, and the normalized magnitude of the ring opening in the pipe is indirectly determined from the above equation using the measured equivalents.

7 Claims, 8 Drawing Figures

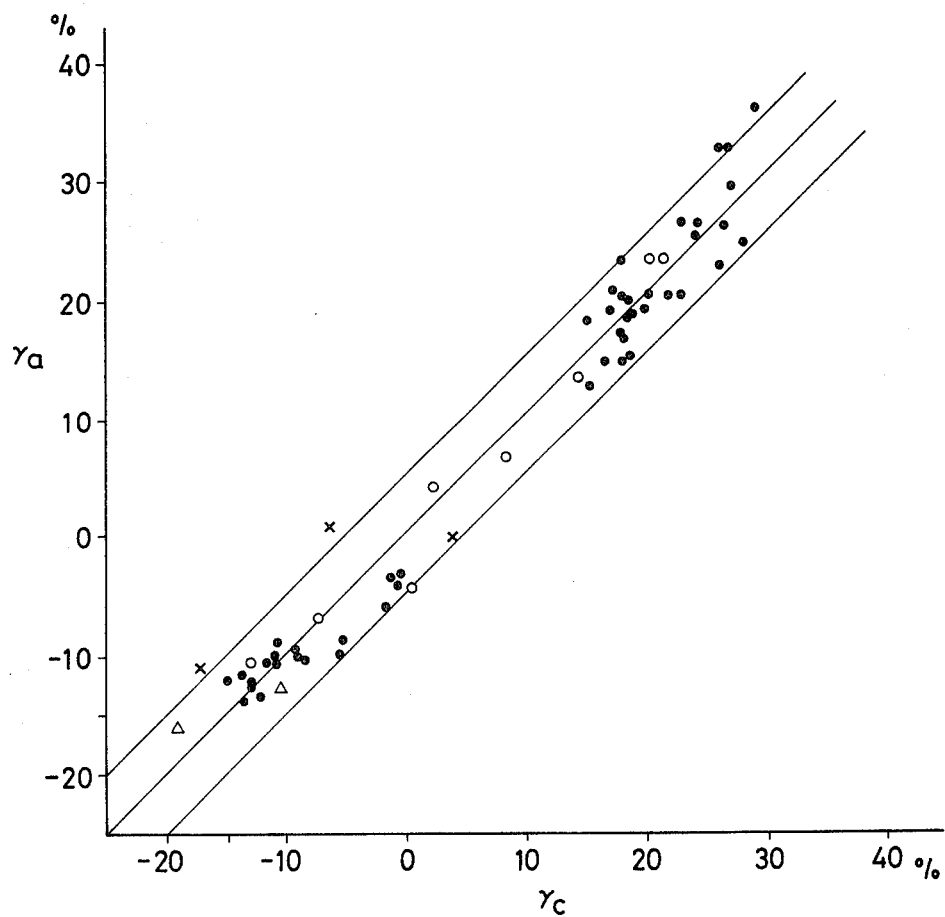

4,485,650

METHOD OF MEASURING THE NORMALIZED MAGNITUDE OF RING OPENING IN SPIRAL PIPE

This invention relates to a method of measuring the normalized magnitude of ring opening in a spiral pipe that permits in-process control of the residual moment in a spiral pipe being manufactured.

BACKGROUND OF THE INVENTION

Some pipe manufacturing processes recently implemented are designed to intentionally leave residual moment of given range in a pipe being manufactured depending upon the application to which the pipe is to be put. To line pipe and other similar pipes upon which pressure is exerted from inside, these processes impart a residual moment acting in such a manner as to contract the pipe resisting the pressure from inside. With pipe piles etc. upon which pressure is exerted from outside, their residual moment imparted acts in such a manner as to expand the pipe resisting the pressure from outside. The residual moment is given by adjusting the load applied by the forming rolls on a pipe mill.

The residual moment results from the residual stress that is distributed across the wall thickness of pipe. The direction and magnitude of the residual stress can be estimated from the magnitude of a ring opening or a ring closing resulting from a longitudinal cut made in the pipe. A ring-like sample S of suitable length (approximately 200 mm to 1,000 mm) is taken from a long pipe manufactured, as shown at (a) in FIG. 1. A cut is made along a straight line parallel to the axis of the pipe (as indicated by a dotted line) to release the residual moment. If the residual moment is an expanding one, the cut in the sample S opens up as shown at (b) in FIG. 1. If the residual moment is a contracting one, on the other hand, the cut closes as shown at (c) in FIG. 1. The amount by which the cut opens ($+\alpha$) and the amount by which the cut closes ($-\alpha$) are collectively known as the magnitude of a ring opening. Even if the magnitude and the direction of the residual moment are the same, the magnitude of a ring opening varies with the outside diameter of pipe. Usually, therefore, the value $\pm\alpha/D$ obtained by dividing the magnitude of ring opening or ring closing by the outside diameter D of pipe is called the normalized magnitude of ring opening $\pm\gamma$ and used as an index to indicate the magnitude of residual moment.

The normalized magnitude of ring opening, or the magnitude of residual moment has an optimum range depending upon the application to which a pipe is put, as stated previously. It is therefore preferable that the magnitude of residual moment in a pipe should be controlled to such an optimum range during the pipe-making process. Measuring the magnitude, however, has conventionally called for such destructive testing as described previously which comprises cutting off a sample and making a residual-moment-releasing slit in it. Practically, however, such testing has scarcely been conducted because it lowers production yield and consumes much labor. Consequently, the normalized magnitude of ring opening has not been controlled so frequently as to be desired, so its variation has been relatively great. This variation, in turn, has sometimes led to the intolerable deformation of product pipe in service, thereby making the pipe no longer serviceable for the intended application.

SUMMARY OF THE INVENTION

An object of this invention is to provide a method of measuring the normalized magnitude of ring opening in a spiral pipe that permits preliminarily estimating said magnitude while the pipe is being manufactured without using any destructive testing.

Another object of this invention is to provide a method of measuring the normalized magnitude of ring opening in a spiral pipe that permits continuously controlling said magnitude or the residual moment in the pipe to fall within a given range during the pipe manufacturing process.

According to this invention, equations expressing the relationships among the equivalent of the subsurface residual stress at a certain point of material strip before entering a spiral pipe mill, the equivalent of the subsurface residual stress at the same point of the formed pipe, the dimensions of the material strip, the outside diameter of the pipe and the normalized magnitude of ring opening in the pipe are established beforehand, using their actually measured values. Here, the equivalent of the subsurface residual stress means an electric signal representing the subsurface residual strain in the piece detected by use of electromagnetism or X-rays. Then, the normalized magnitude of the ring opening in the formed pipe is indirectly determined by substituting the equivalents of the subsurface residual stresses measured during the pipe-making process into said equation.

Thus, this invention permits determining the normalized magnitude of ring opening or the magnitude of residual moment non-destructively, with a resulting remarkable cut-down in measuring time. The method of this invention, which is capable of controlling the residual moment in formed pipe with a high accuracy, can be implemented in line during the pipe-making process.

The normalized magnitude of ring opening can be determined with greater accuracy if the forming load is added as a variable to said equation and is measured along with said two equivalents.

BRIEF DESCRIPTION OF THE DRAWINGS

FIG. 1(a) shows a ring-like sample used for the direct measurement of the normalized magnitude of ring opening. FIGS. 1(b) and 1(c) show pipes in which the residual moment was released by cutting a slit parallel to the longitudinal axis of the sample. FIG. 1(b) shows a case in which the normalized magnitude of ring opening is positive, and FIG. 1(c) shows a case with the negative magnitude;

FIG. 5(a) is a graph showing the relationship between the estimated normalized magnitude of ring opening $\gamma_c$ obtained from the equivalent of subsurface residual stress and forming load and the measured normalized magnitude of the ring opening $\gamma_a$.

DETAILED DESCRIPTION OF THE PREFERRED EMBODIMENT

Figure 1A:
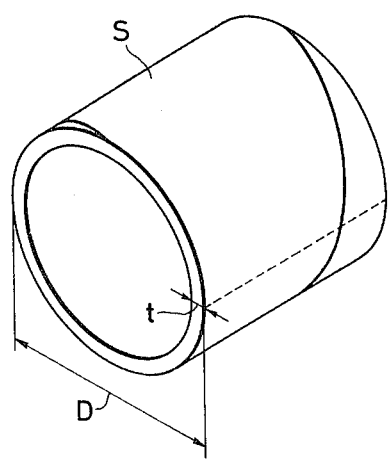
FIGS. 1(a)–1(c) illustrate the normalized magnitude of ring opening in a pipe.
Figure 1B:
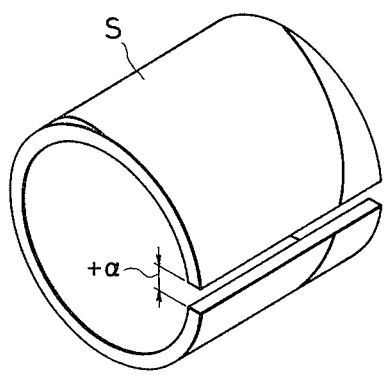
Figure 1C:
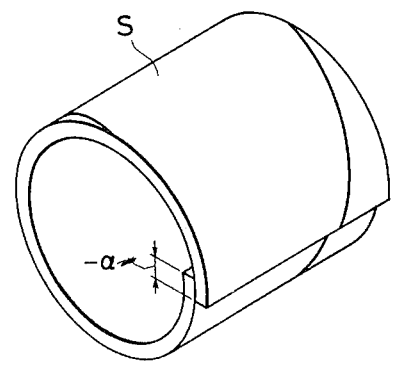

The basic concept of this invention is as follows. It is known that the normalized magnitude of ring opening corresponds to the magnitude of the moment generated by the residual stress varying in the direction of the wall thickness of pipe. With this fact in mind, the normalized magnitude of ring opening, which does not appear unless a slit for destructive testing is cut in a pipe sample, is indirectly determined while a pipe is being manufactured from the definite relationships among the equivalents of the subsurface residual stress at a corresponding point of the material strip and the formed pipe and the forming conditions including the dimensions of the strip and the outside diameter of the pipe, or from the definite relationships among said equivalents, forming conditions and forming load.

Through the analysis of experimental results, the inventors found that the following equations hold good within a general-purpose range where the ratio of strip thickness (which is equal to the thickness of pipe wall) t to outside diameter of pipe D, t/D, is not greater than approximately 1/50 and the normalized magnitude of the ring opening $\gamma$ is approximately $-0.3$ to $+0.3$;

$$\gamma = a_1 \cdot V_F + a_2 \cdot V_P + b + c_1 \cdot V_F^2 + C_2 \cdot V_P^2 + c_3(V_F V_P)^2 \quad (1)$$

or approximately, $$\gamma = a_1 \cdot V_F + a_2 \cdot V_P + d \quad (2)$$

and $$\frac{1}{D} \cdot \left[ \left(\frac{\gamma}{\pi}\right) - \left(\frac{\gamma}{\pi}\right)^2 \right] = e_1 \cdot \frac{V_P}{(t - t_\Delta)} + e_2 \cdot \frac{V_F}{(t - t_\Delta)} + f_1 \cdot \frac{1}{(t - t_\Delta)} + f_2 \cdot \frac{1}{D} + g_1 \cdot \frac{\cos\beta}{w \cdot t^3} \cdot Q_1 + g_2 \cdot \frac{\cos\beta}{w \cdot t^3} \cdot Q_2 \quad (3)$$

where
D = outside diameter of pipe
$\pi$ = circular constant
$V_P$ = equivalent of the subsurface residual stress in the pipe
$V_F$ = equivalent of the subsurface residual stress in the material strip
$t_{66}$ = depth where $V_P$ and $V_F$ are measured
t = thickness of the material strip (and formed pipe)
w = width of the material strip
$\beta$ = forming angle (angle formed between the edge of the material strip and the normal axis of the forming roll)
$Q_1$ = load applied by the entry-side forming roll p0
$Q_2$ = load applied by the second forming roll from the entry-side (usually the intermediate roll)
$a_1, a_2, b, c_1, c_2, c_3$, d = constants defined by strip dimensions and pipe outside diameter
$e_1, e_2, f_1, f_2$ = constants defined by strip grade
$g_1, g_2$ = constants defined by pipe forming machine specifications, such as forming roll spacing and interval between welding point and intermediate forming roll, etc.

The normalized magnitude of ring opening $\gamma$ can be determined while a pipe is being manufactured by placing the measured equivalents of subsurface residual stress, forming load and other forming conditions, and predetermined constants in equation (1), (2) or (3). The forming load $Q_1$ or $Q_2$ necessary for giving a bending moment that provides the desired normalized magnitude of ring opening can be determined by placing such magnitude in equation (3). Then, the normalized magnitude of a ring opening $\gamma$ can be controlled to the desired value by regulating the forming load so that $Q_1$ or $Q_2$ becomes equal to the value determined.

The following describes how to obtain the values used in equations (1) through (3).

The equivalents of the subsurface residual stresses used in equations (1) through (3) are actually measured values. The equivalents of subsurface residual stresses can be found by X-ray stress measurement, magnetostriction measurement, and other methods. Among these methods, magnetostriction measurement is preferable since it can be continuously implemented during the pipe-making process, without being affected by the scale and other conditions on the surface of material strip and formed pipe. The equivalents in an example described here are determined by magnetostriction measurement, although they can be, of course, determined by other method, too.

As it is well known, steel and other ferromagnetic substances have a characteristic that their magnetic properties such as magnetic permeability generally vary with the amount of mechanical strain accumulated in them. Besides, they exhibit what is known as the skin effect which designates the tendency of magnetic fluxes fluctuating at high frequency to concentrate in their subsurface portion. By taking advantage of this skin effect, an alternating magnetomotive force of a given magnitude with such a frequency that measured depth $t_\Delta$ is ensured is applied to a measuring point. Then, changes in the amount of magnetic fluxes corresponding to the mechanical strain within the measured depth $t_\Delta$ are measured by a sensor like a sensing coil or a solid-state magnetic sensor. The resulting output is an equivalent of the subsurface residual stress.

The equivalent of subsurface residual stress found in a material strip is the residual strain resulting from the application of non-uniform rolling and cooling during its manufacturing. When the material is hot-rolled strip, the residual strain due to recoiling is found, as well. The equivalent of subsurface residual stress in formed pipe is the residual strain developed when the pipe is spirally formed and its helical seam welded.

The frequency with which the piece is to be excited is chosen by considering measuring depth $t_\Delta$, the impedance of the measuring system, etc. The preferable frequency is 1 to 2 KHz, although it varies with strip thickness and other factors. The measuring depth $t_\Delta$, which is considered to be substantially equal to the depth to which eddy current induced by the magnetic flux having the exciting frequency penetrates, is, for example, between 0.2 and 1.0 mm.

$V_P$ (in pipe) and $V_F$ (in material strip) used in equations (1) through (3) should be measured at the corresponding point with the alternating magnetomotive force oriented in the same direction with respect to the piece. To ensure such measurement, said sensors for the material strip and formed pipe must be positioned in such a fashion that the measuring point on the strip agrees with that on the formed pipe. In addition, the data measured on the strip must be temporarily stored, by means of a memory device such as a shift register, over a period during which the piece travels from one sensor to the other. $V_P$ and $V_F$ may be measured at one point on the circumference of the pipe. When the rigidity of the forming rolls is relatively low and elastic deformation is not negligible, however, measurement may be conducted at two or more points along the circumference of the pipe and the values obtained from such multi-point measurement averaged for use as $V_P$ and $V_F$ in each equation. This helps determine the normalized magnitude of a ring opening $\gamma$ with greater accuracy since $\gamma$ is the result of the accumulation of residual moments at individual points along the pipe circumference, and residual moments vary circumferentially when the rigidity of the forming rolls is low.

For loads $Q_1$ and $Q_2$ respectively applied by the entry-side and intermediate forming rolls, which are used in equation (3), values determined by a load detector are used. Outside diameter of pipe D, thickness of strip t, width of strip w and forming angle $\beta$ used also in equation (3) are generally those specified as manufacturing conditions since they do not vary much under normal conditions. If any of these varies to an extent beyond the tolerable limit of the normalized magnitude of ring opening, measured value may be used only for such deviating item.

All constants used in equation (1) or (2) can be determined by stratifying the previously measured $V_P$, $V_F$ and corresponding normalized magnitude of ring opening in terms of t/D and subjecting the stratified result to multi-regression analysis.

The constants used in equation (3) can vary with the way their relevant variables are determined. Basically, constants $e_1$, $e_2$, $f_1$ and $f_2$ are dependent upon the magnetostrict properties of material strip, and constants $g_1$ and $g_2$ depend upon the interval between forming rolls, welder position, etc. So they can be established from the specifications of the forming machine and material strip, using some empirical technique like a statistic one.

In practice, a choice among equations (1) through (3) can be made by considering the accuracy needed for the estimation of the normalized magnitude of ring opening $\gamma$, capital investment for relevant measuring instruments, and other factors. For the accuracy of estimation, equation (3) ranks first, followed by equations (1) and (2) in that order.

Figure 2:
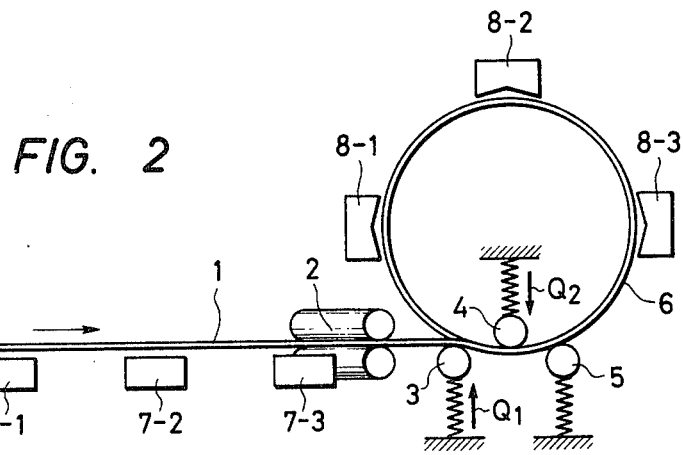
FIG. 2 is a front view showing a spiral pipe being formed.
Figure 3:
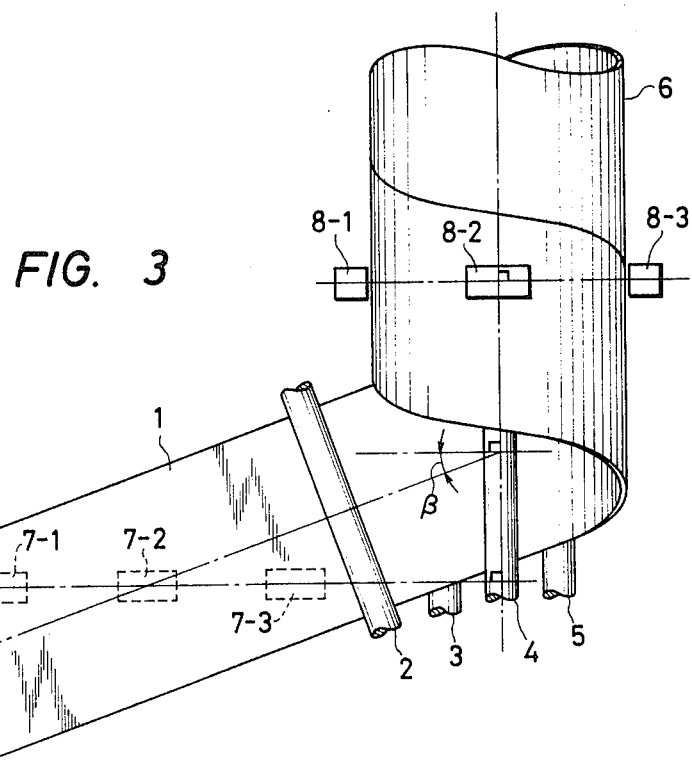
FIG. 3 is a plan view similar to FIG. 2.

Next, a preferred embodiment of this invention will be described by reference to the accompanying drawings. FIG. 2 is a front view showing a spiral pipe being manufactured. FIG. 3 is a plan view similar to FIG. 2.

Pulled by pinch rolls 2, material strip 1 runs over three forming rolls, i.e. an entry-side forming roll 3, an intermediate forming roll 4 and an exit-side forming roll 5, where it is spirally bent, with subsequent welding, into product pipe 6. According to this invention, probes 7-1, 7-2 and 7-3 for measuring the residual stress in the subsurface portion of the strip are provided under its pass line, with their axes aligned to each other and, at the same time, laid perpendicular to the axis of the pipe 6. Each of the probes consists of a C-shaped core with an exciting winding and a secondary pickup winding. The probes used in the preferred embodiment being described each have a pole face 2.5 cm square, with magnetic poles spaced 12.5 cm apart.

In addition, probes 8-1, 8-2 and 8-3 for measuring the residual stress in the subsurface portion of the pipe are disposed so that their axes each lie in a plane perpendicular to the axis of the formed pipe 6. Furthermore, the probes 8-1, 8-2 and 8-3 are spaced apart from each other so that they perform measurement respectively at the same points where the probes 7-1, 7-2 and 7-3 did their measurement on the strip. In the embodiment being discussed, three pairs of probes, 7-1 and 8-1, 7-2 and 8-2, and 7-3 and 8-3 are disposed, with the probes 8-1, 8-2 and 8-3 spaced approximately 90 degrees apart from each other. The number of probe pairs and the angle of spacing, of course, are not limited to those of the embodiment under discussion.

How closely the measuring points on the material strip and formed pipe should agree with each other depends upon the extent to which the equivalent of subsurface residual stress varies in the longitudinal direction. The deviation of as much as 1 to 2 m is allowable if the longitudinal residual stress variation comes within the normal range, but it should be limited to approximately 20 cm if the variation is drastic.

Figure 4:
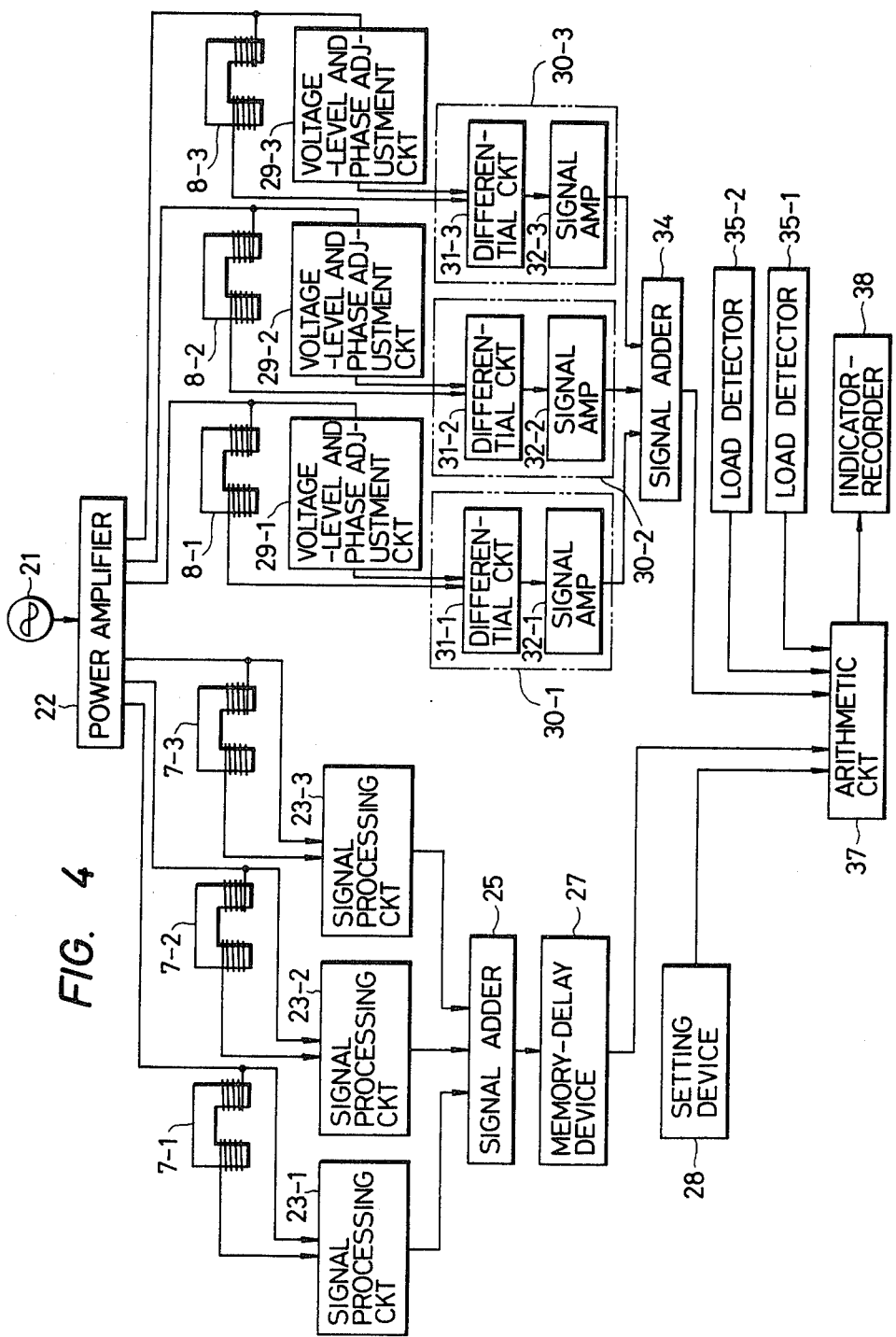
FIG. 4 is a block diagram showing a preferred embodiment of an apparatus operating the method of this invention.

FIG. 4 is a block diagram showing the detecting and signal processing devices used in a preferred embodiment of this invention. A signal of, for example, 1 to 2 KHz generated by a high-frequency signal generator 21 is amplified by a power amplifier 22. The amplified signal is applied to the probes 7-1, 7-2, 7-3, 8-1, 8-2 and 8-3 to generate a given amount of magnetomotive force. The secondary pickup winding of each probe detects a change in the amount of magnetic flux produced which has been caused by a change in the residual stress in the material strip and formed pipe. Then, equivalents of the subsurface residual stress in the strip and pipe are obtained through signal processing circuits 23-1, 23-2 and 23-3 and other similar circuits 30-1, 30-2 and 30-3, respectively.

The inventors have empirically found that phase difference varies greatly when the condition, including quality, of the material strip changes on the entry side of the forming machine, whereas voltage gain varies greatly on the exit side of the forming machine where the stress in the piece has undergone a change. Therefore, it is mainly the phase difference between the voltage applied to the exciting winding and the voltage induced by the secondary winding that is determined by the signal processing circuits 23-1 through 23-3, and it is mainly the gain of the voltage induced by the secondary winding over the voltage applied to the exciting winding that is determined by the signal processing circuits 30-1 through 30-3. By these means, changes in the equivalents of the residual stress in the material strip and formed pipe are grasped quickly and exactly. To be more specific, the signal processing circuits 23-1, 23-2 and 23-3 consist of phase difference detection circuits which detect the phase difference between the reference voltage from the power amplifier 22 and the voltages detected by the probes 7-1, 7-2 and 7-3. The signal processing circuits 30-1, 30-2 and 30-3 consist of differential circuits 31-1, 31-2 and 31-3 and signal amplifiers 32-1, 32-2 and 32-3. The differentiating circuits 31-1, 31-2 and 31-3 subtract the reference voltage from the voltages detected by the probes 8-1, 8-2 and 8-3. The voltage supplied from the power amplifier 22 is turned into the reference voltage in voltage-level and phase adjustment circuits 29-1, 29-2 and 29-3.

By applying the outputs from the signal processing circuits 23-1, 23-2 and 23-3 to a signal adder 25 and the outputs from the signal processing circuits 30-1, 30-2 and 30-3 to a signal adder 34, a typical equivalent of subsurface residual stress in the material strip $V_F$ and a typical equivalent of subsurface residual stress in the formed pipe $V_P$ are determined. The value $V_F$ is temporarily held in a memory-delay device 27 like a shift register, and then put in an arithmetic circuit 37 simultaneously with the value $V_P$ obtained at the corresponding point on the formed pipe. In the meantime, a setting device 28 sets the forming angle $\beta$, pipe outside diameter D, pipe wall thickness t, residual stress measuring depth $t_\Delta$, strip width w, and constants $e_1$, $e_2$, $f_1$, $f_2$, $g_1$ and $g_2$ used in equation (3). The outputs $Q_1$ and $Q_2$ from the load detectors 35-1 and 35-2 detecting the load applied by the forming rolls 3 and 4 are inputted in the arithmetic circuit 37, and the normalized magnitude of ring opening $\gamma$ is determined according to equation (3). Then, the obtained magnitude is indicated and recorded by an indicator-recorder 38. If the forming loads $Q_1$ and $Q_2$ change quickly, one each memory-delay device may be inserted between the load detectors 35-1 and 35-2 and the arithmetic circuit 37 to adjust the time intervals among the signals $V_P$, $V_F$, $Q_1$ and $Q_2$.

If the variation in the equivalent of the subsurface residual stress in the material strip $V_F$ in equation (3) is small, the term containing $V_F$ in the right-side member of equation (3) may be absorbed in the term containing $1/(t-t_\Delta)$. Also, if the normalized magnitude of ring opening $\gamma$ is not very large, the term $(\gamma/\pi)^2$ is negligible. Then, equation (3) is simplified as follows, but, even then, practically high enough accuracy can be obtained.

$$\gamma = \pi D \left[ e_1 \cdot \frac{V_P}{(t-t_\Delta)} + f_1 \cdot \frac{1}{(t-t_\Delta)} + f_2 \cdot \frac{1}{D} + g_1 \cdot \frac{\cos\beta}{w \cdot t^3} \cdot Q_1 + g_2 \cdot \frac{\cos\beta}{w \cdot t^3} \cdot Q_2 \right] \quad (4)$$

Figure 5B:
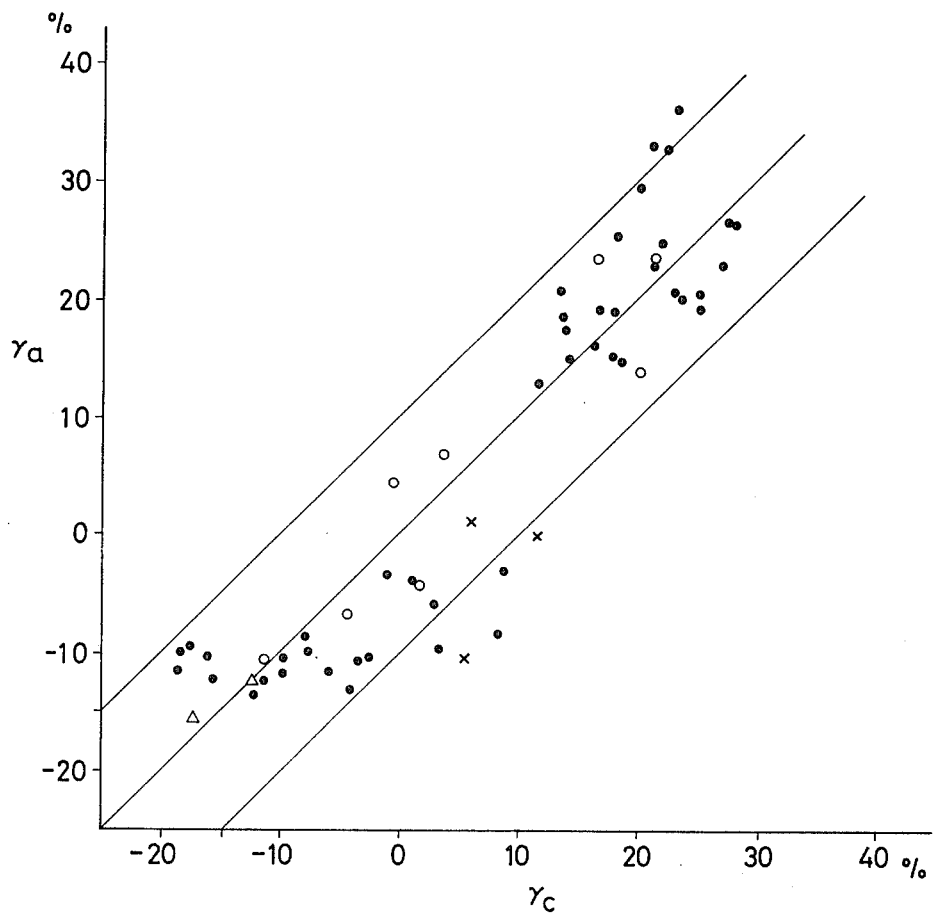
FIG. 5(b) is a graph, showing the relationship between the estimated normalized magnitude of ring opening $\gamma_c$ obtained from the equivalent of subsurface residual stress and the measured normalized magnitude of the ring opening $\gamma_a$.

FIG. 5(a) shows how the normalized magnitude of ring opening in pipe $\gamma_c$ measured by the method using the embodiment described above using the equivalents of subsurface residual stresses and forming load or equation (3) correspond to the normalized magnitude of ring opening in the same pipe $\gamma_a$ actually measured. As seen, the two normalized magnitudes agree well with each other. FIG. 5(b) shows how the normalized magnitude of a ring opening in pipe $\gamma_c$ measured by using the equivalents of subsurface residual stresses or equation (2) corresponds to the normalized magnitude of ring opening in the same pipe $\gamma_a$ actually measured. The accuracy of the method shown in FIG. 5(b), though somewhat lower than that in FIG. 5(a), is practically high enough for some kinds of pipe, depending upon their specifications.

Theoretically, the following relationship exists between the residual moment Mp and the normalized magnitude of ring opening $\gamma$ in a product pipe.

$$Mp = \frac{Et^3}{12\rho_p} \cdot \frac{\gamma}{\pi + \gamma} \quad (5)$$

where
E=Young's modulus of material strip
t=thickness of pipe wall
$\rho_p$=radius of product pipe Accordingly, it is within the scope of this invention to indicate the residual moment Mp in place of the normalized magnitude of ring opening $\gamma$ as the result of measurement.

As described in the foregoing, the method according to this invention permits preliminarily estimating the normalized magnitude of ring opening in a spiral pipe while the pipe is being manufactured, thereby making it possible to continuously control the normalized magnitude of the ring opening or the residual moment in the product pipe within an optimum range during the pipe-manufacturing process.

What is claimed is:

1. A method of measuring the normalized magnitude of a ring opening in a sprial pipe comprising:
    measuring, while the spiral pipe is being manufactured, a subsurface residual stress at a certain point on a material strip before it enters a spiral-pipe forming machine and measuring a subsurface residual stress at a point corresponding to said point on the formed pipe using a means for measuring said two stresses which are provided on an entry and exit side of said forming machine; and
    indirectly determining the normalized magnitude of the ring opening in the pipe using the measured stress values and a preliminarily formulated equation expressing the relationship among said two stresses and a constant related to the size of the material strip and the outside diameter of the pipe.

2. A method of measuring the normalized magnitude of a ring opening in a spiral pipe according to claim 1, whrerein the subsurface residual stresses are measured by measuring magnetic fluxes which are detected at the surface of the material strip and the surface of the finished pipe, the strip and the pipe being magnetized by a given amount of magnetomotive force.

3. A method of measuring the normalized magnitude of a ring opening in a spiral pipe comprising:
    measuring, while the spiral pipe is being manufactured, a subsurface residual stress at a certain point on a material strip before it enters a spiral-pipe forming machine and measuring a subsurface residual stress at a point corresponding to said point on the formed pipe using a means for measuring said two stresses which are provided on an entry and exit side of said forming machine and measuring the loads which are applied by first and second forming rolls from the entry side of the forming machine using a means for measuring said two loads; and
    indirectly determining the normalized magnitude of the ring opening in the pipe using the measured values and a preliminarily formulated equation expressing the relationship among a constant related to the quality of the material strip, a constant related to the equipment specifications of the forming machine, the size of the material strip, the outside diameter of the finished pipe, the depth at which said stresses were measured, the angle of forming, and said two measured stresses and two measured loads.

4. A method of measuring the normalized magnitude of a ring opening in a spiral pipe according to claim 3, wherein the subsurface residual stresses are measured by measuring magnetic fluxes which are detected at the surface of the material strip and the surface of the finished pipe, the strip and the pipe being magnetized by a given amount of magnetomotive force.

5. A method of measuring the normalized magnitude of a ring opening in a spiral pipe according to claim 1, wherein said equation comprises:

$$\gamma = a_1 \cdot V_F + a_2 \cdot V_P + b + c_1 \cdot V_F^2 + c_2 \cdot V_P^2 + c_3 (V_F V_P)^2$$

wherein
- $\gamma$ = the normalized magnitude of the ring opening,
- $V_P$ = the measured subsurface residual stress in pipe,
- $V_F$ = the measured subsurface residual stress in material strip, and
- $a_1, a_2, b, c_1, c_2, c_3$ = constants defined by strip dimensions and pipe outside diameter.

6. A method of measuring the normalized magnitude of a ring opening in a spiral pipe according to claim 1, wherein said equation comprises:

$$\gamma = a_1 \cdot V_F + a_2 \cdot V_P + d$$

wherein
- $\gamma$ = the normalized magnitude of the ring opening,
- $V_P$ = the measured subsurface residual stress in pipe,
- $V_F$ = the measured subsurface residual stress in material strip, and
- $a_1, a_2, d$ = constants defined by strip dimensions and pipe outside diameter.

7. A method of measuring the normalized magnitude of a ring opening in a spiral pipe according to claim 3, wherein said equation comprises:

$$\frac{1}{D} \cdot \left[ \left( \frac{\gamma}{\pi} \right) - \left( \frac{\gamma}{\pi} \right)^2 \right] = e_1 \cdot \frac{V_P}{(t - t_\Delta)} + e_2 \cdot \frac{V_F}{(t - t_\Delta)} + f_1 \cdot \frac{1}{(t - t_\Delta)} + f_2 \cdot \frac{1}{D} + g_1 \cdot \frac{\cos\beta}{w \cdot t^3} \cdot Q_1 + g_2 \cdot \frac{\cos\beta}{w \cdot t^3} \cdot Q_2$$

wherein
- $\gamma$ = the normalized mangitude of the ring opening,
- D = the outside diameter of pipe,
- $\pi$ = a circular constant,
- $V_P$ = the meausred subsurface residual stress in pipe,
- $V_F$ = the measured subsurface residual stress in material strip,
- $t_\Delta$ = the depth where $V_P$ and $V_F$ are measured,
- t = the thickness of material strip and formed pipe,
- w = the width of material strip,
- $\beta$ = the forming angle which is the angle formed between the edge of the material strip and the normal axis of a forming roll,
- $Q_1$ = the load applied by the entry-side forming roll,
- $Q_2$ = the load applied by the second forming roll from the entry-side,
- $e_1, e_2, f_1, f_2$ = constants defined by strip grade, and
- $g_1, g_2$ = constants defined by pipe forming machine specifications.

* * * * *